(12) United States Patent  (10) Patent No.: US 9,230,284 B2
Whitton et al.  (45) Date of Patent: Jan. 5, 2016

(54) CENTRALLY MANAGED AND ACCESSED SYSTEM AND METHOD FOR PERFORMING DATA PROCESSING ON MULTIPLE INDEPENDENT SERVERS AND DATASETS

(71) Applicant: DELOITTE LLP, London (GB)

(72) Inventors: Andrew John Whitton, Redhill (GB); Anthony David Sayce, Doncaster (GB); Christopher William Ninnes, Hertfordshire (GB); William Edward Owen Cubitt-Smith, London (GB); Neal Adam Kemp, London (GB)

(73) Assignee: DELOITTE LLP, London (GB)

( * ) Notice: Subject to any disclaimer, the term of this patent is extended or adjusted under 35 U.S.C. 154(b) by 296 days.

(21) Appl. No.: 13/847,813

(22) Filed: Mar. 20, 2013

(65) Prior Publication Data

US 2014/0289359 A1  Sep. 25, 2014

(51) Int. Cl.
*G06F 15/16* (2006.01)
*G06Q 40/00* (2012.01)

(52) U.S. Cl.
CPC ........................................ *G06Q 40/12* (2013.12)

(58) Field of Classification Search
USPC ............................ 709/206, 217, 223; 370/225
See application file for complete search history.

(56) References Cited

U.S. PATENT DOCUMENTS

| | | | | |
|---|---|---|---|---|
| 6,633,547 | B1 * | 10/2003 | Akatsu | H04L 12/2803 370/255 |
| 6,671,715 | B1 | 12/2003 | Langseth et al. | |
| 6,772,131 | B1 | 8/2004 | Francis et al. | |
| 7,366,894 | B1 * | 4/2008 | Kalimuthu | H04L 63/0272 713/153 |
| 8,234,338 | B1 * | 7/2012 | Dagum | H04L 51/30 709/201 |
| 2001/0044758 | A1 * | 11/2001 | Talib | G06F 17/30622 705/26.1 |
| 2002/0087454 | A1 | 7/2002 | Calo et al. | |
| 2002/0087455 | A1 | 7/2002 | Tsagarakis et al. | |
| 2003/0144970 | A1 | 7/2003 | Coyne | |

(Continued)

FOREIGN PATENT DOCUMENTS

| | | |
|---|---|---|
| GB | 2460984 A | 12/2009 |
| WO | 92/15953 A1 | 9/1992 |

(Continued)

OTHER PUBLICATIONS

Search Report issued in GB application No. GB1305141.2 dated Sep. 16, 2013 and corresponding Examination Opinion dated Sep. 17, 2013.

(Continued)

*Primary Examiner* — Tesfay Yohannes
(74) *Attorney, Agent, or Firm* — Maier & Maier, PLLC

(57) ABSTRACT

A method of data processing between a hub computer and a plurality of spoke computers is disclosed. The hub computer is arranged to communicate with each of the spoke computers. Furthermore, each spoke computer is remote from the hub computer and remote from each other. The method comprises: (a) receiving at the hub computer from a user a request for the spoke computer to run a data processing operation on accounting data of an organization hosting the spoke computer, the accounting data locally accessible by the spoke computer; (b) the hub computer communicating the request to the spoke computer; (c) in response to receiving the request, the spoke computer running the data processing operation on the accounting data; and (d) the spoke computer returning results of the data processing operation to the hub computer.

18 Claims, 10 Drawing Sheets

(56) References Cited

U.S. PATENT DOCUMENTS

| | | | |
|---|---|---|---|
| 2005/0044197 A1* | 2/2005 | Lai | G06Q 10/10 709/223 |
| 2008/0155118 A1* | 6/2008 | Glaser | G06F 17/30867 709/238 |
| 2010/0082407 A1 | 4/2010 | Akkiraju et al. | |
| 2011/0069634 A1* | 3/2011 | Hajiaghayi | H04L 45/00 370/254 |
| 2011/0178940 A1* | 7/2011 | Kelly | G06Q 10/1053 705/321 |
| 2012/0174225 A1* | 7/2012 | Shyamsunder | G06F 21/566 726/24 |
| 2013/0073387 A1* | 3/2013 | Heath | G06Q 50/01 705/14.53 |
| 2013/0226925 A1* | 8/2013 | Carbonell | G06F 17/30719 707/740 |

FOREIGN PATENT DOCUMENTS

| | | |
|---|---|---|
| WO | 01/57613 A2 | 8/2001 |
| WO | 2008079386 A1 | 7/2008 |
| WO | WO2008122000 A3 | 10/2008 |

OTHER PUBLICATIONS

International Search Report dated Jun. 23, 2014, including the Written Opinion of the International Searching Authority, in connection with International Application No. PCT/GB2014/050883.

Extended European Search Report dated Jan. 23, 2015, including the European Search Report and the European Search Opinion, in connection with EP Application No. 14160981.8.

* cited by examiner

CENTRALLY MANAGED AND ACCESSED SYSTEM AND METHOD FOR PERFORMING DATA PROCESSING ON MULTIPLE INDEPENDENT SERVERS AND DATASETS

FIELD

This invention relates to data processing. Aspects of this invention relate to a data processing system and to a method of data processing. At least certain embodiments are directed towards solving technical problems that exist with data processing in the financial auditing industry.

BACKGROUND

Many different data processing systems already exist, such as Microsoft SQL Server, SAS, SPSS, and ACL. These typically allow the analysis of data that is held on a server performing the analysis or held on another server within the same data center or legal entity and to which the server performing the analysis has access. To process data held at a plurality of locations remote from each other and remote from the server performing the analysis, it is necessary first to pull the data into a common location.

There are, however, significant technical problems with processing data held and originating in different data centers, or from different legal entities. For example, should it be necessary to take a copy of the data from one data center, and move it to another data center for processing, numerous security risks are introduced. These include the possible loss of portable media drives or CDs. The movement of data can also be made problematic by the existence of agreements with trade unions, privacy concerns, reputational concerns or legal restrictions (such as the European Data Protection Directive 95/46/EC or The Swiss Federal Data Protection Act and the Swiss Federal Data Protection Ordinance). These may prevent a copy of the data from being legally taken outside the originating data center.

One example of an industry where these data processing problems are particularly evident is the financial auditing industry in which the relevant regulatory framework reinforces these problems.

By way of background, large organizations such as certain companies or partnerships, are subjected to external financial audit or other similar third-party regulatory inspections on a periodic basis. At its simplest, the purpose of an external financial audit is to validate that the prepared financial accounts of a particular organization (often referred to as the "target" of the auditing) meet the relevant accounting standards, and to provide reasonable assurance, but not absolute assurance, that the financial statements are presented fairly, in all material respects, and give a true and fair view in accordance with the prevailing financial reporting framework. Auditing firms typically audit accounts of their clients every 12 months, and may have many hundreds or thousands of clients, that is "targets", which they audit.

When performing the external financial audit of a large company, the financial auditor may be required to sample a subset of a larger set of transactions in order to gain assurance that certain risks have not crystallized in the period under review. For example, when testing fixed assets, it is allowable for the target of the audit to include the purchase of a new building as an addition, however it is generally not allowable to include the repainting of walls within an existing building.

Identifying the two different types of transaction is relatively simple where transaction volumes are small and each item can be reviewed by a human. Where volumes increase, selecting a sample of transactions (typically up to 75) from a population of thousands of transactions appears to provide reasonable coverage of the population and thus a good probability of identifying material error. However, large companies may have millions of fixed asset movements which are required to be reviewed in each audit period. Only reviewing a small sample becomes less valuable in reducing audit risk, and also in identifying value-add findings to Audit targets.

In order to overcome this problem, data analysis can be used to perform tasks which help an auditor to determine which transactions should be subjected to a human review, and discount those which are not high risk, by analyzing an entire population of transactions regardless of the volume of data.

A number of technical problems are typically encountered when performing this type of work. These include:

Large volumes of data must be obtained for analysis by the auditor, in a cost effective way.

Data is generally only obtained during one key audit phase, limiting the times when the results of the analysis are available to the auditor.

Clients are generally opposed to the export of large volumes of data from their data centers due to significant security concerns around data loss.

Significant time and cost is incurred by the auditing firm in performing the same types of data analysis tasks, for multiple audit targets on the same types of data. For example, Fixed Asset data generally takes a similar form at all companies, but would typically be performed as an independent data analysis task for each audit target.

It is therefore desirable to provide a data processing system and/or method that at least addresses certain of these problems.

SUMMARY

According to a first aspect of this invention, there is provided a method of data processing, wherein a hub, comprising a hub computer, is arranged to communicate with each of a plurality of spokes, each comprising a respective spoke computer, each spoke remote from the hub and from each other, the method comprising the steps of:

(a) receiving at the hub from a user a request for the spoke to run a data processing operation on accounting data of an organization hosting the spoke, the accounting data locally accessible by the spoke;

(b) the hub communicating the request to the spoke;

(c) in response to receiving the request, the spoke running the data processing operation on the accounting data; and (d) the spoke returning results of the data processing operation to the hub.

The method may include a step subsequent to step (d) of the hub returning the results to the user. Step (d) may be preceded by the step of receiving at the hub a request for the results of the data processing operation to be returned to the hub for accessing by the or another user.

The request received at the hub from the user may be a request to run the data processing operation at a selected group of the spokes. This may be preceded by a step of the user selecting the group of the spokes. The group may be of one, more or all of the spokes. Subsequent steps may then be carried out by each spoke in the group.

The accounting data may be a copy of data of source data, wherein at least a portion of the source data is obtained from an IT system of the organization hosting the spoke.

The request may comprise implementation information indicative of how the data processing operation is to be implemented. The implementation information may comprise instantiation information indicative of how a general data processing operation is to be instantiated; and/or the implementation information may comprise configuration information indicative of thresholds with respect to which the instantiated data processing operation is to be carried out. In step (d), running the data processing operation may comprise running the instantiated data processing operation with respect to the thresholds.

According to a second aspect of the invention, there is provided a method of data processing, wherein a hub, comprising a hub computer, is arranged to communicate with each of a plurality of spokes, each comprising a respective spoke computer, each spoke remote from the hub and from each other, the method comprising the steps of:

(a) receiving at the hub from a user a request for the spoke to run a data processing operation on accounting data of an organization hosting the spoke, the accounting data locally accessible by the spoke;

(b) the hub communicating the request to the spoke; and (c) the hub receiving results of a data processing operation from the spoke.

The method may include a step subsequent to step (b) and before step (c) of, in response to receiving the request, the spoke running the data processing operation on the accounting data.

The method may comprise the step of the or another user developing an analytic at the hub, the analytic comprising information indicative of the data processing operation. The method may comprise the step of the or another user modifying an analytic at the hub, the analytic comprising information indicative of the data processing operation. The analytic may be arranged for subsequent instantiation and configuration. The method may comprise the step of adding the analytic to an analytic library at the hub, the analytic library locally accessible by the host and comprising a plurality of analytics, each analytic comprising information indicative of a respective data processing operation to be carried out by a spoke. The step of developing and/or adding the analytic may precede the step of receiving the user request at the hub.

The method may comprise the step of the hub communicating an analytic to a spoke, the analytic comprising information indicative of the data processing operation to be carried out by the spoke. This may be in response to an appropriate request at the hub by the or another user. The step of communicating the analytic may comprise selecting a subset of the spokes, and communicating the analytic to each spoke in the subset. The step of communicating the analytic may comprise selecting all of the spokes and communicating the analytic to each spoke.

The step of communicating the analytic to the spoke or spokes may be preceded by the step of selecting the analytic from a/the plurality of analytics in an/the analytic library locally accessible by the host, each analytic comprising information indicative of a respective data processing operation to be carried out by a spoke. The step of communicating the analytic to the spoke or spokes may comprise communicating a plurality of analytics to the spoke or each selected spoke. The analytic library may be communicated to the or each selected spoke in this way.

The step of communicating the analytic to the or each selected spoke may be preceded by the step of a user generating a new analytic that is not comprised in the analytic library, the new analytic indicative of a new data processing operation to be carried out by the or a spoke on the accounting data. This new analytic may then be communicated to the or each selected spoke.

The method may comprise the step of the hub authenticating the identity of the user. The method may comprise the step of providing communication with a permitted group only of the plurality of spokes based on the authenticated identity of the user. The permitted group may be one, more or all of the spokes.

The or each request from the user may be received locally at the hub. The request may be received virtually locally at the hub, for example from a user with access to the hub from an off-site location but as if the user were a local user. The or each request may be received locally at a spoke.

According to a third aspect of this invention, there is provided a method of operating a hub as defined in the first aspect, the method comprising the steps of the method of that first aspect that are carried out by the hub.

According to a fourth aspect of this invention, there is provided a method of operating a spoke as defined in the first aspect, the method comprising the steps of the method of that first aspect that are carried out by the spoke.

According to a fifth aspect of this invention, there is provided a method of data processing wherein a hub, comprising a hub computer, is arranged to communicate with each of a plurality of spokes, each comprising a respective spoke computer, each spoke remote from the hub and from each other, the method comprising the steps of the hub communicating a plurality of analytics to each of a selected group of the spokes, the analytics comprising information indicative of a respective data processing operation to be carried out by each spoke on accounting data of an organization hosting the spoke, the accounting data locally accessible by the spoke.

The selected group may comprise one, more or all spokes.

According to a sixth aspect of this invention, there is provided a method of data processing wherein a hub, comprising a hub computer or a plurality of hub computers, is arranged to communicate with each of a plurality of spokes, each comprising a respective spoke computer or plurality of spoke computers, each spoke remote from the hub and from each other, the method comprising the step of communicating an analytic to each of a selected group of the spokes may be preceded by the steps of: generating at the hub, under the control of a user, a new analytic that is not comprised in an analytic library at the hub, the new analytic indicative of a new data processing operation to be carried out by each spoke in the selected group on the respective accounting data; and the hub communicating the new analytic to each spoke in the selected group.

The selected group may comprise one more or all spokes.

Optional features of the method of the first aspect are also optional features of the method of each other aspect.

According to a seventh aspect of this invention, there is provided a hub as defined in any other aspect, the hub programmed and operable to carry out the steps of the method carried out by the hub in the method of any other aspect.

According to an eighth aspect of this invention, there is provided a spoke as defined in any other aspect, the spoke programmed and operable to carry out the steps of the method carried out by a spoke in the method of any other aspect.

The hub and/or the spoke may comprise a computer, such as a server. The hub and/or spoke may comprise a plurality of computers, such as a plurality of servers.

According to a ninth aspect of the invention, there is provided a hub, comprising a hub computer arranged to communicate with each of a plurality of spokes, each comprising a respective spoke computer, each spoke remote from the hub and from each other, the hub computer comprising a communication unit arranged to: receive from a user a request for the spoke to run a data processing operation on accounting data of an organization hosting the spoke, the accounting data locally accessible by the spoke; communicate the request to the spoke; and receive results of a data processing operation from the spoke.

The results of the data processing operation received from the spoke may be the result of the spoke running the data processing operation in response to the request from the hub.

According to a tenth aspect of this invention, there is provided a spoke, comprising a spoke computer arranged to communicate with a hub, the hub comprising a hub computer, the spoke remote from the hub, the spoke computer comprising: a communication unit arranged to receive a request from the hub for the spoke computer to run a data processing operation on accounting data of an organization hosting the spoke; and a processing unit arranged to run the data processing operation on the accounting data, in response to the receipt by the communication unit of the request; the spoke communication unit further arranged to return the results of the data processing operation to the hub.

According to an eleventh aspect of this invention, there is provided a computer program product comprising a record of code portions that are executable by a computer to cause that computer to carry out the steps of a method of any other aspect. The computer program product could be arranged for use at a spoke for performing those method steps arranged to be implemented by the spoke. Furthermore, the computer program product could be arranged for use at a hub for performing those method steps arranged to be implemented on a hub.

The computer program product could be, for example, an electronic, magnetic, optical, electromagnetic, infrared, or semiconductor system, or a propagation medium for data transmission, for example for downloading the code over the Internet. The computer program product may alternatively take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer may be configured in accordance with such code to perform one or more processes in accordance with the various methods discussed herein. Herein, a computer may be any form of a data processing system. Furthermore, such a computer or data processing system may be a single unit or a distributed system. For example, such a computer may comprise a plurality of data processing devices distributed across a local or wide area network.

The spokes may be remote from each other in that they are not arranged for communication with each other. The spokes may be arranged to prevent spokes communicating with each other in a way that enables accounting data of an organization hosting a spoke to be transferred to another spoke. The spokes may be remote from each other in that they are not arranged for local communication with each other. For example, the spokes may not be on the same local network. The spokes may be hosted by organizations that are separate entities or that are not part of the same group of entities. The hub may be hosted by an organization providing financial auditing services. The spokes may be geographically remote from each other and from the hub in addition to being remote in a communications sense.

The systems and/or methods may be applied in industries other than the auditing industry. The systems and/or methods may be used to process data other than accounting information.

Optional features defined hereinabove may be combined; they may be provided in embodiments in isolation from each other.

BRIEF DESCRIPTION OF THE DRAWINGS

Specific embodiments will be described below by way of example only and with reference to the accompanying drawings, in which.

SPECIFIC DESCRIPTION OF CERTAIN EXAMPLE EMBODIMENTS

Figure 1:
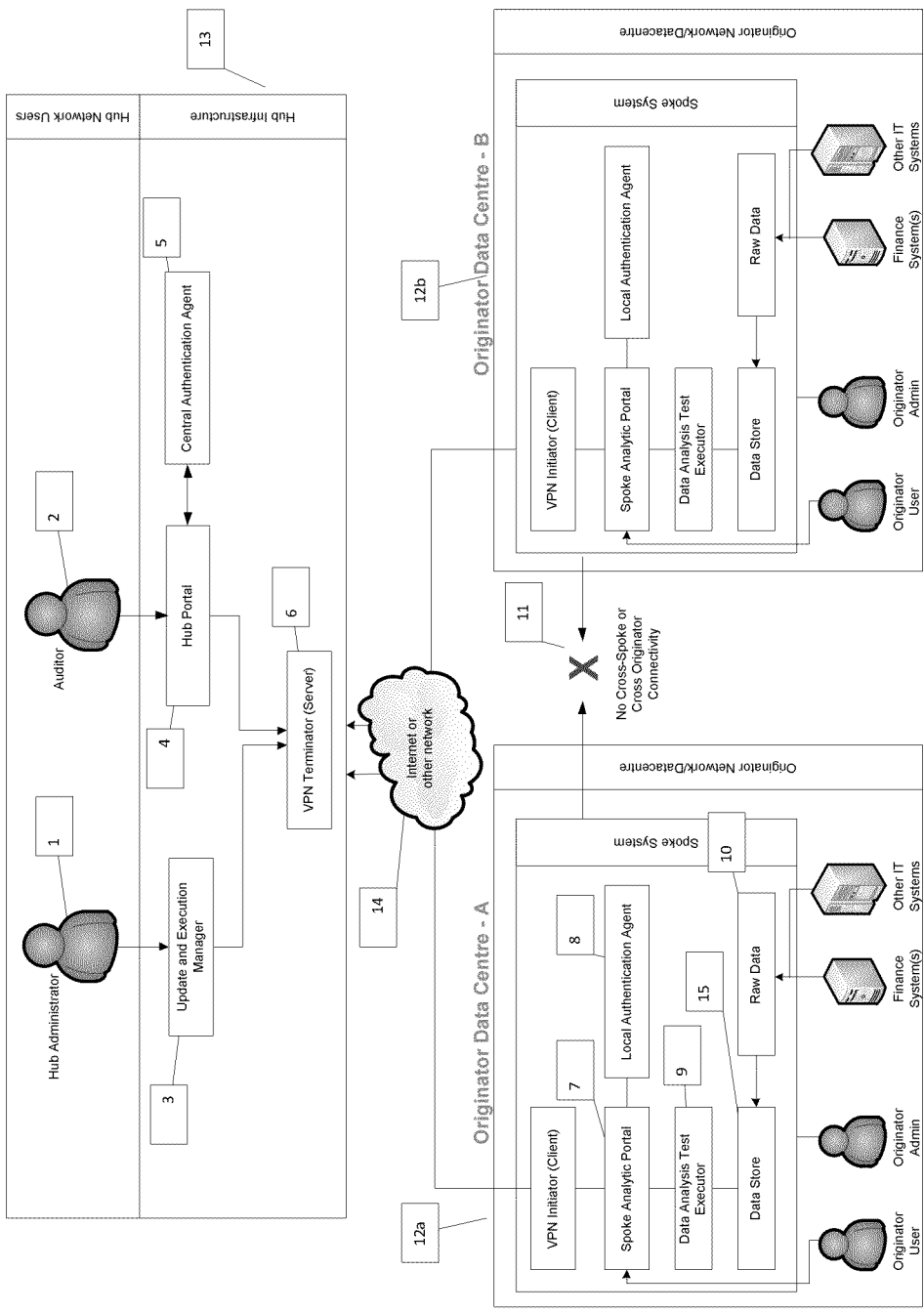
FIG. 1 is a schematic diagram of a data processing system.

FIG. 1 shows a data processing system. In this embodiment, the data is data relating to the business of a target organization, including data used for financial accounting purposes. In this embodiment, the data processing system is a data processing system in the auditing industry. In order to provide context, the following short description of an example auditing process is given.

Large organizations such as certain companies or partnerships are subjected to external financial audit or other similar third-party regulatory inspections of their financial position and practices on a periodic basis. In its simplest terms, the purpose of an external financial audit is to validate that the prepared financial accounts meet the relevant accounting standards, and to provide reasonable assurance, but not absolute assurance, that an organization's financial statements are presented fairly, in all material respects, and give a true and fair view in accordance with the relevant financial reporting framework In order to obtain this assurance the audits typically include a number of stages. These stages are usually undertaken by an auditor and include:

Planning: an overall assessment of the organization that is to be audited, referred to herein as the target organization (or "target"), is undertaken to determine the high level risks which may cause a material error in that company's accounts. This may include risks both within the company (such as declining profit margin), and those outside the company (such as the political situations in key trading territories).

Analytical review: typically involves a more detailed review of the target's accounts, such as comparing historical trends against current performance, and performing statistical analysis on the relationships between certain balances throughout the year, again to identify potential risks which may lead to misstatement of the accounts.

Audit execution: based on the outcome of the planning and analytical review, the audit execution phase involves inspecting the target's transactions in the areas of material risk, at a granular level. This inspection includes, but is not limited to: sampling of financial transactions; reviewing the detail and substance of the transaction against potential sources of error; recalculation of key balances based on source or "raw" information; tracing transactions through the company's accounts from initiation to completion; and inspecting source documents or third party evidence to confirm balances and transactions.

Audit reporting: auditors report the overall financial audit conclusion, typically whether the conclusion of the audit is a qualified or unqualified opinion, provide details of any material findings to the target, and provide 'value-add' findings and observations. These value-add observations are generally noted during the course of the wider audit work and are not typically relevant in reaching the audit conclusion. They may, however, be of benefit to the target's management or shareholders (such as by increasing revenue, decreasing costs, or avoiding certain potential risks to the organization).

Auditing firms typically audit accounts of their clients—the target organizations referred to in this document—at least every 12 months, and may have many hundreds or thousands of clients which they audit.

Returning now to FIG. 1, the system has a central hub arranged to communicate with each of a plurality of spoke entities. In this embodiment, the hub is a central hub server 1.13. However, in other embodiments several servers that make up a server cluster may form the hub. Each spoke entity is embodied by a spoke server or, in other embodiments, a server cluster. In this embodiment, two spoke servers 1.12*a* and 1.12*b* are shown and described for simplicity. In other embodiments, however, there may be many more spoke servers. In this embodiment, the hub server 1.13 is hosted in the data center of a firm providing auditing services. Each of the two spoke servers 1.12*a*, 1.12*b*, is hosted in the data center of an audit target (the concept of which is explained above). In this example, the audit targets are wholly independent from each other and, of course, from the auditing firm. For example, one audit target could be a chain of supermarkets and the other audit target could be a mobile phone service provider. The audit targets could be companies which are direct competitors. The architecture of the hub and spoke system prevents 1.11 the sharing of data and communication between two spoke servers 1.12*a*, 1.12*b*. This is of particular relevance where two spoke servers exist within the data centers of competing companies. In this embodiment, each of the servers is in the form of existing computer hardware arranged to be programmed and operable to carry out the steps of methods that amount to embodiments. Each of the servers includes a processing unit arranged to process data, a memory arranged to store data and a communication unit arranged for communication with external devices, such as other servers within the system.

The general operation of the system will now be described, with continued reference to FIG. 1. At a high level, the central 'hub' system 1.13 and infrastructure facilitate secure and efficient access to the 'spoke' servers 1.12*a*, 1.12*b* for maintenance and updates, whilst also allowing users 1.1, 1.2 with access to the hub to view data analysis results from any spoke server 1.12*a*, 1.12*b*. The analysis results may comprise statistics, metrics, profiles, lists, charts, diagrams, or samples of transactions which meet certain criteria. The self-contained 'spoke' servers 1.12*a*, 1.12*b* store a complete set of raw data 1.10, perform data analysis tasks against this set of data 1.10, and store the processed results. This allows the hub infrastructure 1.13 to view the results without taking its own copy of the entire set of underlying raw data 1.10, which may be confidential or sensitive in nature. Typically the raw data 1.10 held on the spoke server 1.12*a*, 1.12*b* would comprise a significant volume of transactions (i.e. over 100,000), rather than relating to the configuration or status of a component or device. The data 1.10 held on each spoke server 1.12*a*, 1.12*b* is explicitly kept apart from the data on other spoke servers 1.12*a*, 1.12*b*, but the data store 1.15 in which it is stored is structurally the same in each spoke server 1.12*a*, 1.12*b*. In other embodiments, the data store 1.15 is not structurally the same in each spoke server 1.12*a*, 1.12*b*, but has a basic structure which is the same for each spoke server 1.12*a*, 1.12*b*, with additional features in the data store(s) of one or more of the spoke servers 1.12*a*, 1.12*b*. It is anticipated that the structure of the raw data 1.10 will not match the required format for data held in the data store 1.15, where this is the case a data transformation is undertaken to restructure the data. The transformation can be performed by any suitable technology such as industry standard Extract Transform Load (ETL) software.

Continuing the high-level description of the system's operation, the system is used by an auditor 1.2. The auditor 1.2 connects to a 'hub portal' 1.4 hosted on the hub 1.13. This hub portal 1.4 is, in the present embodiment, is in the form of a graphical user interface. The auditor 1.2 accesses the hub portal 1.4 using a computer, for example a laptop that connects to the hub via a local connection or a virtual local connection. Analysis is performed by one of the data analysis test executors 1.9 hosted on the spoke servers 1.12*a*, 1.12*b* on a data set 1.10 provided by an audit target, as will be described in more detail below with reference to FIGS. 8 and 9. The hub portal 1.4 displays the outcome of this analysis, as produced by the spoke analytic portal 1.7. The hub 1.13 infrastructure comprises a central authentication agent 1.5. The central authentication agent determines which audit(s) the auditor 1.2 is authorized to access, and allows the auditor 1.2 to view the relevant results. The hub portal 1.4 determines routing to the spoke server 1.12*a*, 1.12*b*.

Once the auditor 1.2 is assigned to the correct audit target and its respective spoke server (in this example 1.12*a* as opposed to 1.12*b*), the auditor 1.2 is able to review the output of data analysis on the spoke target via a spoke analytics portal 1.7. This provides the results of the analysis performed by the data analysis system 1.9 hosted on the spoke server 1.12*a*, 1.12*b*, without requiring a copy of direct raw data 1.10 or the data store 1.15 to be sent to the hub 1.13. As a result, the auditor 1.2 is not able to view the raw data 1.10 or data store 1.15, which remains stored in the audit target's 1.12*a* data center, thus improving data security and reducing data storage and processing requirements on the hub 1.13.

Additionally, this allows the auditor 1.2 to 'self-serve' the results of the analysis at any time, as a connection 1.14 between the hub 1.13 and the spokes 1.12a, 1.12b is maintained throughout the year, not just during the periods of peak audit effort. This improves the speed with which the auditor 1.2 can gain access to the results, and also improves result availability, as there is no manual step requiring an administrator-type user to manually analyze and send the results of the analysis on each spoke 1.12a, 1.12b to the auditor 1.2 on a pre-agreed schedule.

Multiple spokes 1.12a, 1.12b are connected to a single hub 1.13. This makes it possible for the same piece of analysis to be performed on each spoke 1.12a, 1.12b, significantly reducing the overall time and cost to develop and execute analysis. For example, where the fixed asset data (which at a high level could comprise a list of; the asset identifier, a description of the asset, the date it was acquired, the purchase cost, the depreciation charged to date, the anticipated useful economic life, the profit center to which it relates, and details of any changes made the assets data since it was added to the system) for multiple audit targets can be stored in the same form, the hub 1.13 can provide the data analysis test executor 1.9 with a set of data analysis tests that can be executed independently by each spoke 1.12a, 1.12b on the local audit target's specific data set 1.10 at a time appropriate to the auditor 1.2 of that target. This significantly reduces the time required to perform this analysis across all targets. It also reduces the complexities typically associated with version control, as a single set of centrally-managed, centrally-tested, and centrally-quality-checked data analysis routines can be pushed to all spokes 1.12a, 1.12b from the hub 1.13, rather than maintaining audit target-specific analysis routines.

Figure 2:
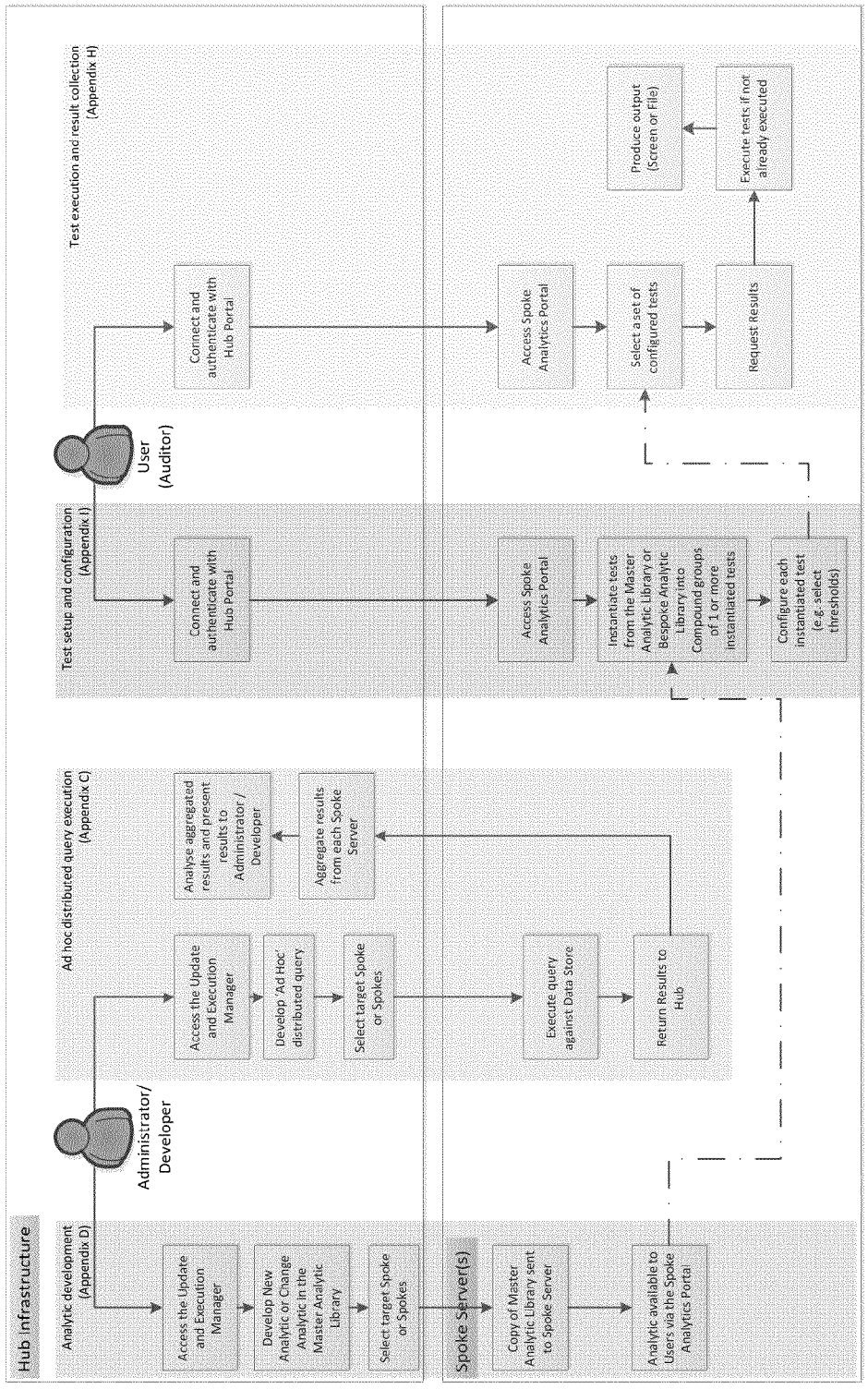
FIG. 2 is a flow diagram showing, in overview, four methods of operation of the data processing system.

Four specific operations of the system will now be described. FIG. 2 shows process flows for these four key types of user interaction. These will firstly be described at a high level, from left to right of FIG. 2. The first operation is analytic development, in which an analytic—a data processing operation to be carried out on the data store 1.15 of one or more audit targets, respectively stored on one or more spoke servers 1.12a, 1.12b—is developed or changed before being copied to the spoke server 1.12a, 1.12b. This is described in more detail below with reference to FIG. 3. The second operation shown in FIG. 2 is "ad hoc" distributed query execution, in which an "ad hoc" data analysis test is pushed to each spoke server 1.12a, 1.12b from the hub 1.13. This operation is described in more detail below with reference to FIG. 4. The third operation is test setup and configuration, in which data analysis tests (or analytics) from the hub 1.13 are instantiated on a particular spoke server 1.12a, 1.12b and configured for the particular audit target to which the spoke server 1.12a, 1.12b is linked. This operation is described in more detail below with reference to FIG. 5. The fourth operation, shown at the far right of FIG. 2, is test execution and result collection, which consists of two parts. Firstly, a data analysis test executor 1.9 on a spoke server 1.12a, 1.12b executes at least one data analysis test or analytic on data 1.15 stored at the spoke server 1.12a, 1.12b. This first part of the operation is described in more detail below with reference to FIG. 8. Secondly, the user 1.2 accesses the spoke server 1.12a, 1.12b via the hub 1.13 to collect the results of this data analysis test. This second part of the operation is described in more detail below, with reference to FIG. 9.

Figure 3:
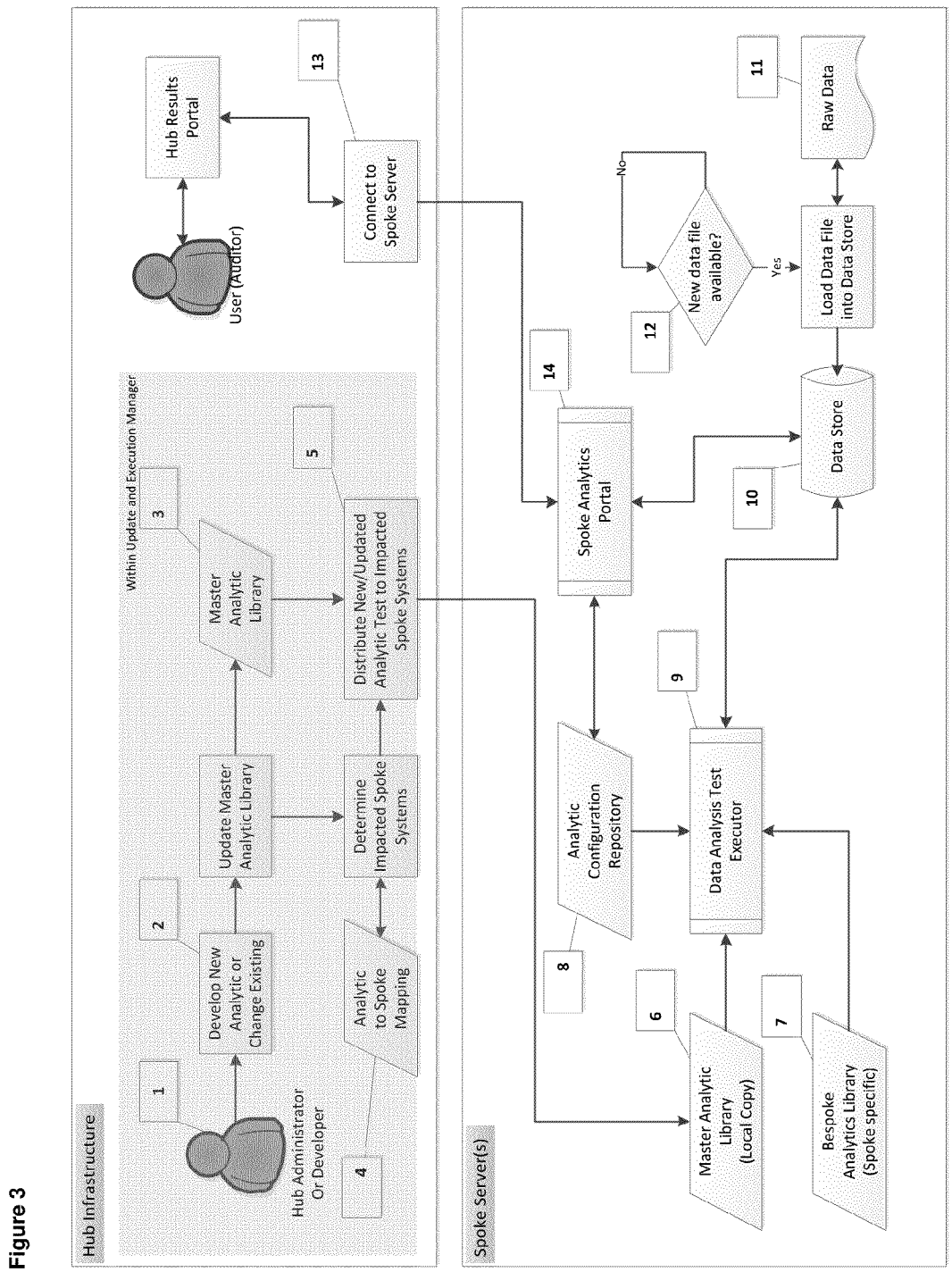
FIG. 3 is a schematic diagram of a hub and spoke infrastructure of the data processing system for general processing and user interaction, including a first one of the methods of FIG. 2.

As mentioned, FIG. 3 shows software infrastructure for the analytic development process depicted at the left of FIG. 2. This will now be described in detail. With continued reference to FIG. 3, also shown is the process flow for distributing new data analysis tests from the hub infrastructure 1.13 to the individual spoke servers 1.12a, 1.12b. In outline, data analysis tests are built on the hub 1.13 and stored in a master analytic library 3.3. The tests are then distributed centrally from the master analytic library 3.3 on the hub server 1.13 to one or more of the spoke servers 1.12a, 1.12b. This substantially reduces the management overhead required to add new tests to each spoke server 1.12a, 1.12b. The analytic development process (or update of data analysis tests) would be performed by an administrator-type super-user 3.1.

Figure 6:
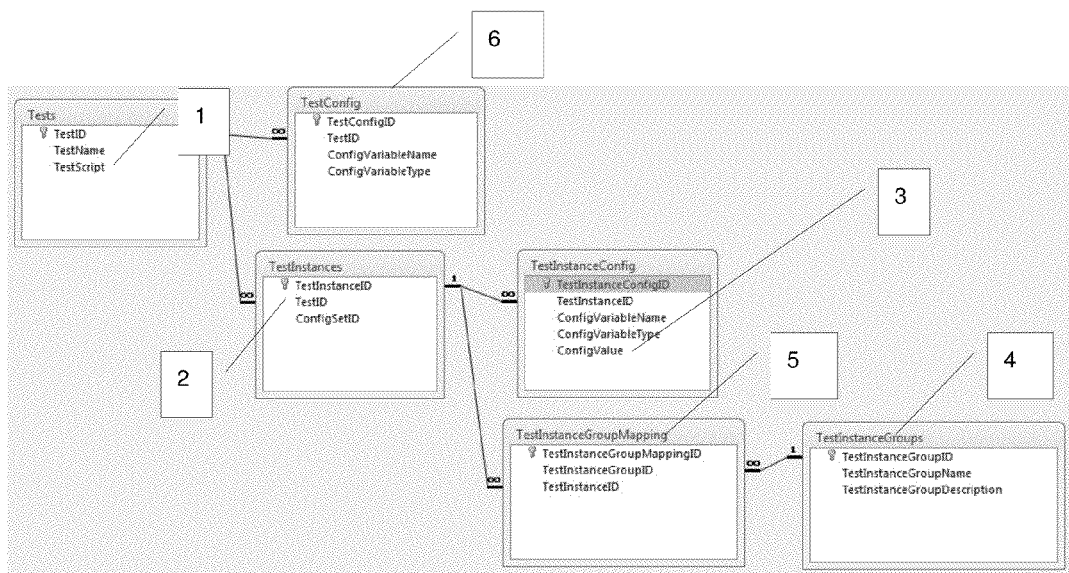
FIG. 6 is a schematic representation of a technology-agnostic data structure for the storage, on a spoke server, of a master analytic library and analytic configuration repository.

The analytic development process referred to above will now be described in more detail. In the analytic development process, a new data analysis test is developed 3.2 on the hub 1.13 infrastructure, for deployment to one or more spoke systems 1.12a, 1.12b. The test, which could use any existing technology, or language, is stored in a master analytic library 3.3 within the hub 1.13 infrastructure. The master analytic library 3.3 stores all the data analysis tests in a defined data structure, in addition to information about the tests such as the name, version number, and user who last edited the test. FIG. 6 shows a data structure which in this embodiment is used to store this library 3.3. In other embodiments, other data structures are used as there are many ways of doing this. The data structure of FIG. 6 will be described in more detail below.

Returning now to FIG. 3, a data analysis test to spoke mapping 3.4 holds details of which tests are deployed to which spokes 1.12a, 1.12b. This therefore allows a hub administrator 3.1 or developer to distribute a new or updated test to one or more spoke systems 1.12a, 1.12b on a selective basis. Once the impacted spoke systems 1.12a, 1.12b for a new or changed analysis test have been identified, a process running on the hub 1.13 connects to each spoke server (sequentially or in parallel) to make the data analysis test available 3.5 to a local master analytic library 3.6 on the spoke 1.12a, 1.12b. The local copy 3.6 of the master analytic library 3.3 contains all the details held on the hub 1.13 but is held locally on the spoke server 1.12a, 1.12b. The local copy 3.6 is used by a data analysis test executor 3.9. By storing a copy 3.6 of the master analytic library 3.5 locally, the spoke server is capable of continuing to operate indefinitely without a connection to the hub 1.13 infrastructure. Thus in the event of a loss of connectivity to the hub 1.13, the spoke 1.12a, 1.12b will continue to run until connectivity is restored.

Figure 7:
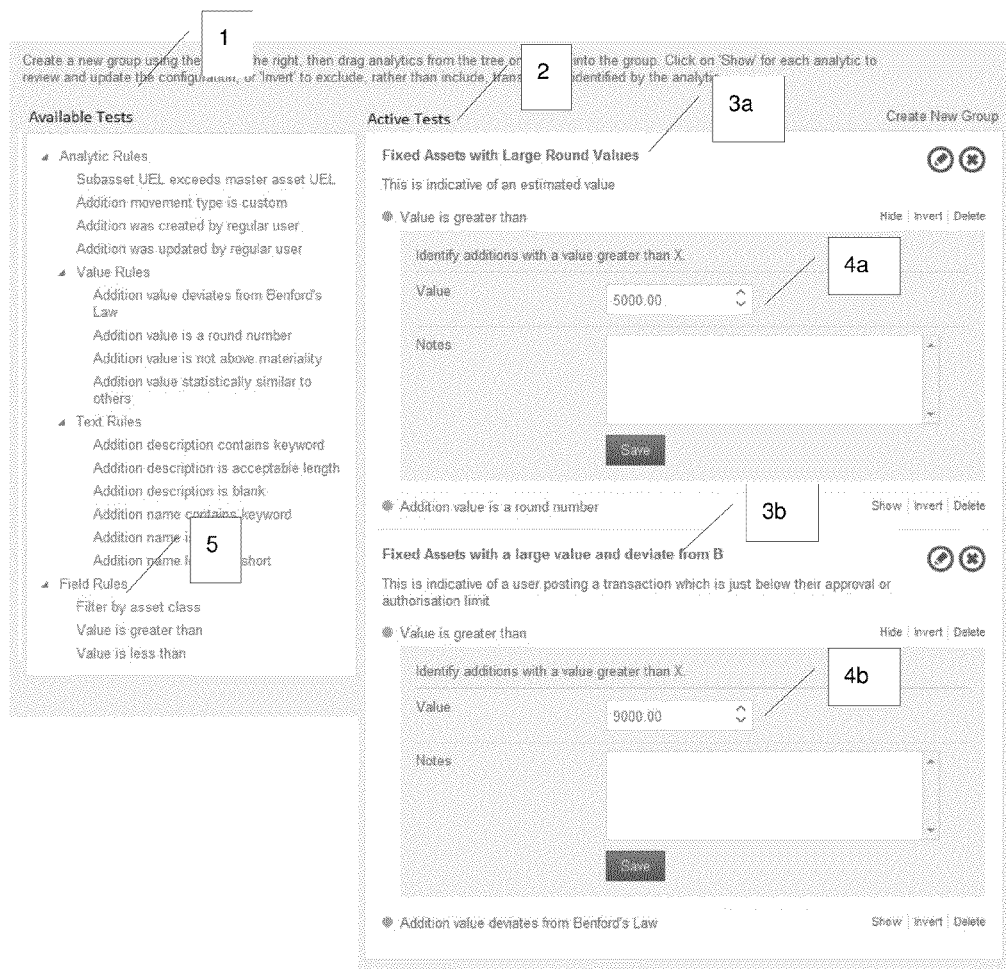
FIG. 7 shows an example user interface for a spoke analytic portal to allow a user to select data analysis tests from the local copy of the master analytic library or the bespoke analytic library and assign their configuration values.

A bespoke analytics library 3.7 held on the spoke server 1.12a, 1.12b contains data analysis tests which have been written for the specific spoke server, rather than written on the hub server 1.13 for distribution to other spokes. An analytic configuration repository 3.8 contains the list of tests (from either the local spoke server 1.12a, 1.12b copy 3.6 of the master analytic library 3.3 or the bespoke analytics library 3.7) which have been selected for use by the end user, such as the auditor 1.2. The analytic configuration repository 3.8 also contains the configuration for each of the selected tests. For example, if using a data analysis test from the master analytic library 3.6 called "Identify transactions with a Value greater than X", the analytic configuration repository includes an entry to activate (i.e. instantiate) this test, plus the user defined value for the X value. The data analysis test executor 3.9 is responsible for taking the user-requested test lists, and the associated test from the local copy 3.6 of the master analytic library 3.3 or the bespoke analytics library 3.7, and executing that test against the information held in a data store 3.10. FIG. 7 shows the data analysis test executor interface, which will be described in more detail below.

With continued reference to FIG. 3, raw data 3.11 is supplied to the spoke server 1.12a, 1.12b. It can be supplied from other IT systems within the audit target's datacenter or internal network. This raw data 3.11 is data which can be analyzed to determine facts, trends or anomalies in the audit target's accounts. The raw data 3.11 may take the form of flat files, structure data files, or direct interfaces into other systems. The raw data 3.11 is expected to be loaded on a frequent basis (e.g. daily). When new raw data 3.11 is received 3.12, this is detected by a device on the spoke server 1.12a, 1.12b. The data 3.11 is then loaded into a data store 3.10 on the spoke server 1.12a, 1.12b. This may involve manipulating the data 3.11 in order to make its structure meet the requirements of the structure of the data store 3.10. The data store 3.10 therefore contains all of the raw data 3.11. This data is held in a data structure. The data structure is structurally the same for all spokes 1.12a, 1.12b, although the data held in the structure may be wholly unrelated. It is also possible to hold additional data structures in one or more spoke systems 1.12a, 1.12b, although there would remain a common core structure. In other embodiments, the data store 1.15 is not structurally the same in each spoke server 1.12a, 1.12b, but has a basic structure which is the same for each spoke server 1.12a, 1.12b, with additional features in the data store(s) of one or more of the spoke servers 1.12a, 1.12b.

The hub infrastructure allows end users (such as auditors 1.2 employed by the auditing company that hosts the hub) to connect 3.13 through the hub 1.13 to the specific spoke system 1.12a, 1.12b they wish to access. This transparently presents the end user with the respective spoke's analytic portal 3.14, appearing to the end user 1.2 that the portal is actually hosted on the hub infrastructure 1.13.

Figure 10:
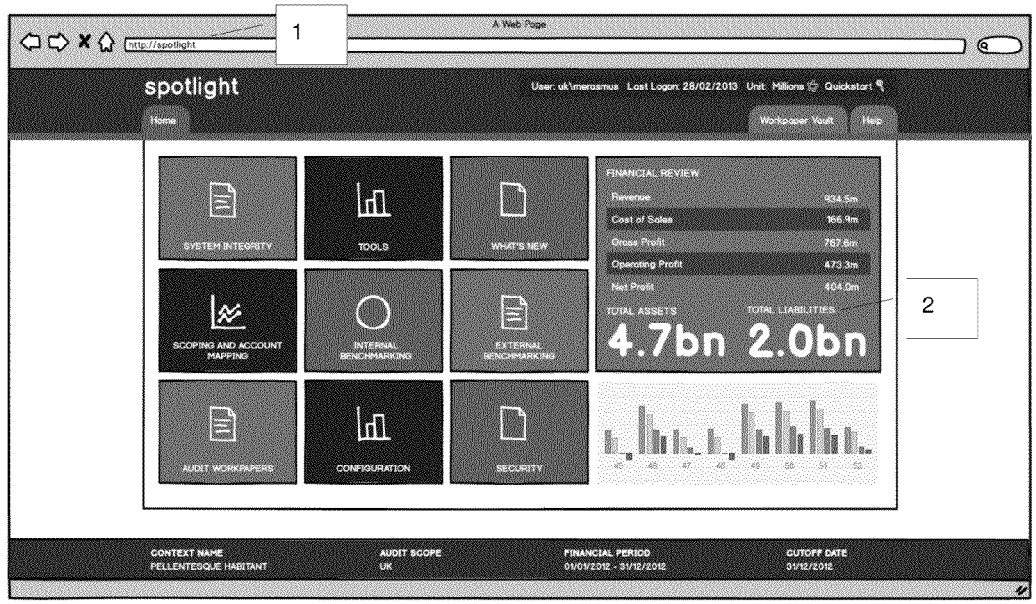
FIG. 10 shows an example user interface for the spoke analytic portal on the spoke server.

A spoke analytics portal 3.14 provides the end user with the ability to select data analysis tests from the local copy 3.6 of the master analytic library 3.3, or from the bespoke analytic library 3.7. The spoke analytics portal 3.14 further allows the user 1.2 to configure these tests (the data for which his stored in the analytic configuration repository 3.8). Finally, the spoke analytics portal 3.14 allows the user 1.2 to view the results of the data analysis tests which are stored in the data Store 3.10. Examples of user interfaces to provide this functionality are depicted in FIGS. 7 and 10.

Figure 4:
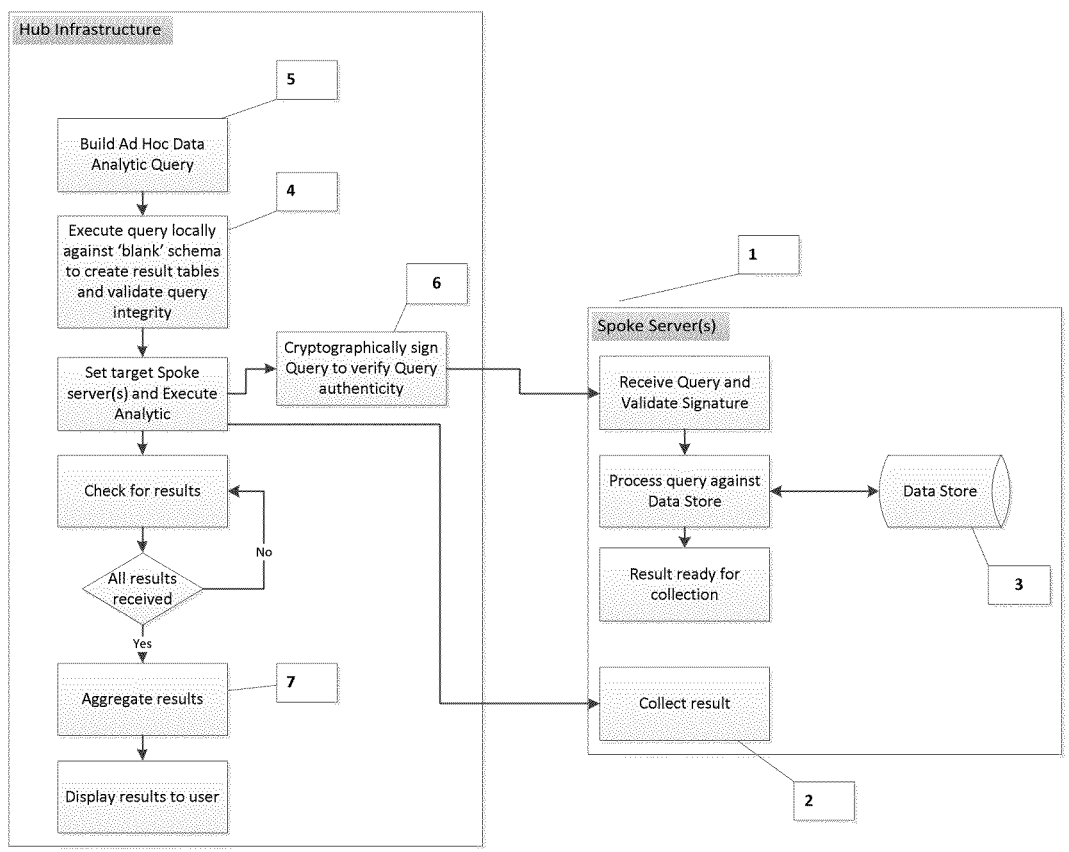
FIG. 4 is a flow diagram of a second one of the methods of FIG. 2: the execution of an 'ad hoc' data analysis test from a hub server to spoke servers.

FIG. 4 is a flow of the second process shown in FIG. 2, that of distributing 'ad hoc' queries to the spoke servers 1.12a, 1.12b. An 'ad hoc' query would be a data analysis test which is created by a developer or hub admin and pushed down to one or more spoke servers 1.12a, 1.12b, this differs from the normal data analysis process as the result is collated on the Hub 1.13 for further analysis. This allows for comparison of trends or metrics between the spokes, for instance a user may wish to know the average number of fixed assets owned by each spoke, this data analysis test is written on the hub 1.13 and pushed to each spoke 1.12a, 1.12b and the totals of each spoke collated then averaged thereafter on the hub 1.13. An update and execution manager 1.3 on the hub server 1.13 distributes the queries to multiple spoke servers 1.12a, 1.12b and collates the results. Since there is a perpetual connection between the hub 1.13 and each spoke, an administrator 1.1 can securely 'send' a data analysis test to each spoke. The result of the data analysis is collated 4.7 on the hub 1.13. This allows for benchmarking between audit targets. For example, it would be possible to create a test to assess each target's working capital trend, then using the update and execution manager 1.3 to send the test to each spoke server 1.12a, 1.12b in parallel, obtain each result, and perform a second pass data analysis test to determine which quartile each audit target appears in.

In more detail, the process of distributing an 'ad hoc' query involves the following steps. First, an 'ad hoc' query is built 4.5 on the hub infrastructure 1.13 by an administrator-type user 3.1 and executed 4.4 locally on the hub infrastructure 1.13 against 'blank' schema to create result tables and to validate the integrity of the query. The target spoke servers 1.12a, 1.12b for the query are selected and the ad hoc query or analytic is executed. Still on the hub infrastructure 1.13, the query is cryptographically signed to verify its authenticity. It is then sent to the spoke server(s) 1.12a, 1.12b which were selected as its target. The spoke server(s) 1.12a, 1.12b receive the query and validate the cryptographic signature. Still on the spoke server(s) 1.12a, 1.12b, the query is processed against the data store(s) 4.3 of the target server(s) 1.12a, 1.12b, and a result is produced, ready for collection. On the hub infrastructure 1.13, a check for results is performed. When all results are received, the results are aggregated 4.7 and displayed to the user 3.1.

Figure 5:
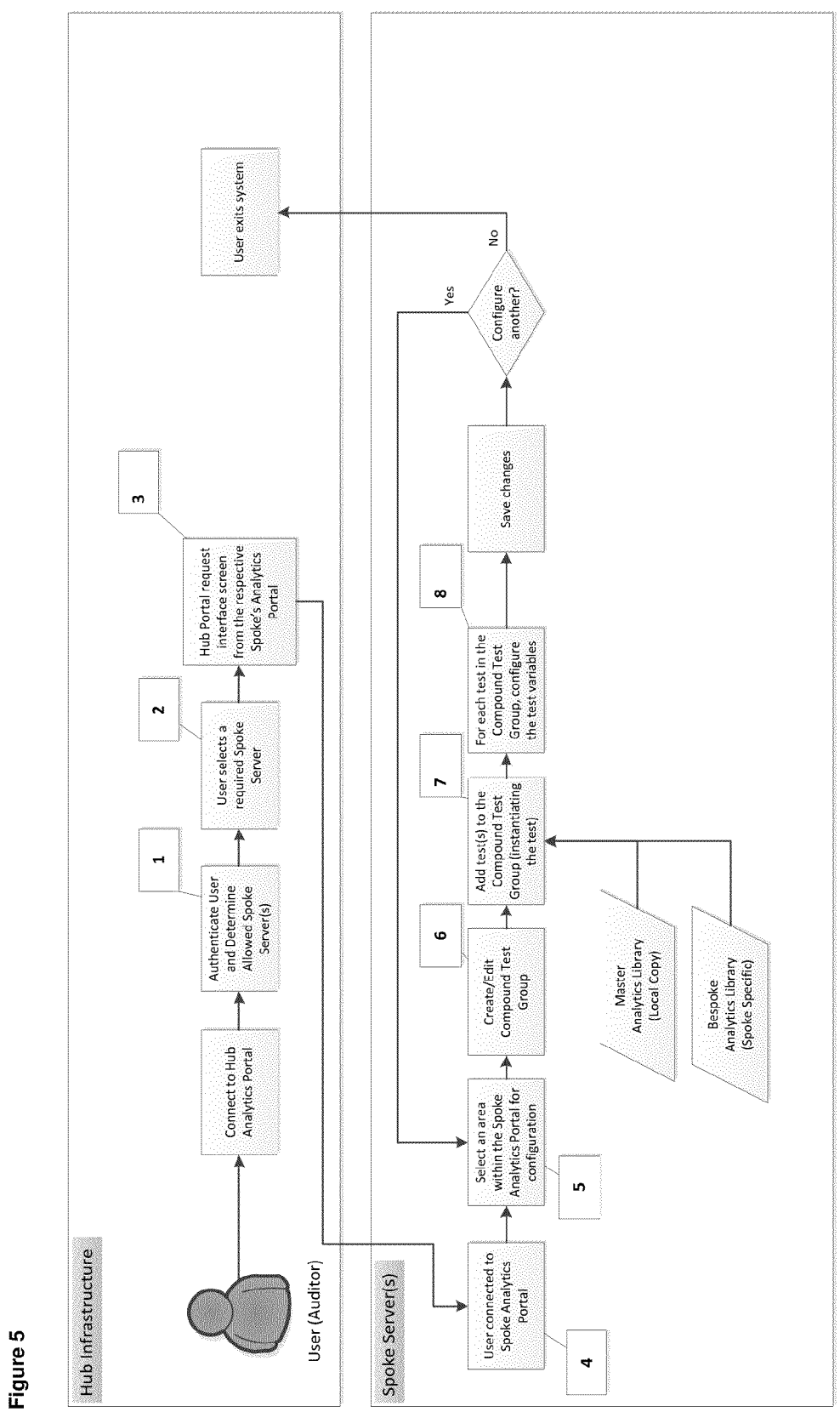
FIG. 5 is a flow diagram of a third one of the methods of FIG. 2: allowing a user to access a spoke server via the hub infrastructure for the purpose of setup and configuration of tests.

FIG. 5 depicts the process of test setup and configuration (the third operation shown in FIG. 2). In this process, data analysis tests (or analytics) from the hub 1.13 are instantiated on a particular spoke server 1.12a, 1.12b and configured for the particular audit target to which the spoke server is linked. The steps of this process will now be described.

First, a user 1.2 on the hub network connects to the hub infrastructure 1.13, typically from an end user PC or laptop. The user authenticates 5.1 in order to confirm his or her identity to the hub 1.13. The hub 1.13 determines to which spoke or spokes 1.12a, 1.12b the user 1.2 is allowed access. The user 1.2 then selects 5.2 the spoke server 1.12a, 1.12b that he or she wishes to access. All future requests processed by the hub 1.13 in this session will then be executed, transparently, against the respective spoke server 1.12a, 1.12b. The transparent element means that there are no further user 1.2 actions required to access the spoke 1.12a, 1.12b, nor is the user 1.2 aware of the additional activities undertaken to obtain the results from the spoke 1.12a, 1.12b. The hub 1.13 passes 5.3 requests between itself and the spoke server 1.12a, 1.12b in order to present the user 1.2 with a user interface (possible examples of which are shown in FIGS. 7 and 10) to make configuration changes to the data analysis tests. A spoke analytics portal 1.7 awaits a request from the hub server 1.13. Once a request is received, this is processed locally and resulting screens are displayed to the user. The user 1.2 then selects 5.5 an area within the system. This could be, for instance, Revenue, Payroll, or Fixed Assets. The user 1.2 creates 5.6 a new compound test group. This is a container for holding data analysis tests together. The compound group would be given a name and a description by the user 1.2 to aid a future user in understanding its purpose. The data analysis tests are then assigned to the compound group. The result of all of the tests within a compound group is then used to determine if that specific group is a pass or fail. Data analysis tests from the local 1.12a, 1.12b copy of the master analytics library 3.6 or the bespoke analytics library 3.7 are instantiated 5.7, i.e. set to run with a specific configuration from within a specific compound test group. A test can be instantiated multiple times in different compound test groups, each with the same or different configuration. The user 1.2 can configure 5.8 each instantiated data analysis test to run with its own set of configuration. Each test has a list of configurable values (such as thresholds), which the user 1.2 can set based on his or her needs.

FIG. 7 shows a user interface for the configuration of data analysis tests. This user interface includes a list 7.1 of available tests (not yet selected by user 1.2), populated from the local copy 3.6 of the master analytic library 3.3 and the bespoke analytic library 3.7 and a list 7.2 of active (instantiated) tests selected, configured and maintained by the user 1.2.

In this embodiment, within the list 7.2 of active tests, there is a compound test group 7.3a, here called a "TestInstanceGroup" 6.4 (see FIG. 6), to identify large round value items using the two tests "Value is greater than" and "Addition value is a round number". This compound test group 7.3a includes the test 7.4a "Value is greater than" used with the configuration threshold of $5000, where the configuration is held in the analytic configuration repository 3.8. There is also a second separate compound test group 7.3b to identify transactions which are large and deviate from Benford's Law using the two tests "Value is greater than", and "Addition value deviates from Benford's Law". This second compound test group 7.3b includes a test 7.4b, which is the same "Value is greater than" test 7.4a set up by the user 1.2 to have a configuration threshold of $9000. The user 1.2 can create additional compound test groups and drag the available tests into any compound test group 7.5.

Figure 8:
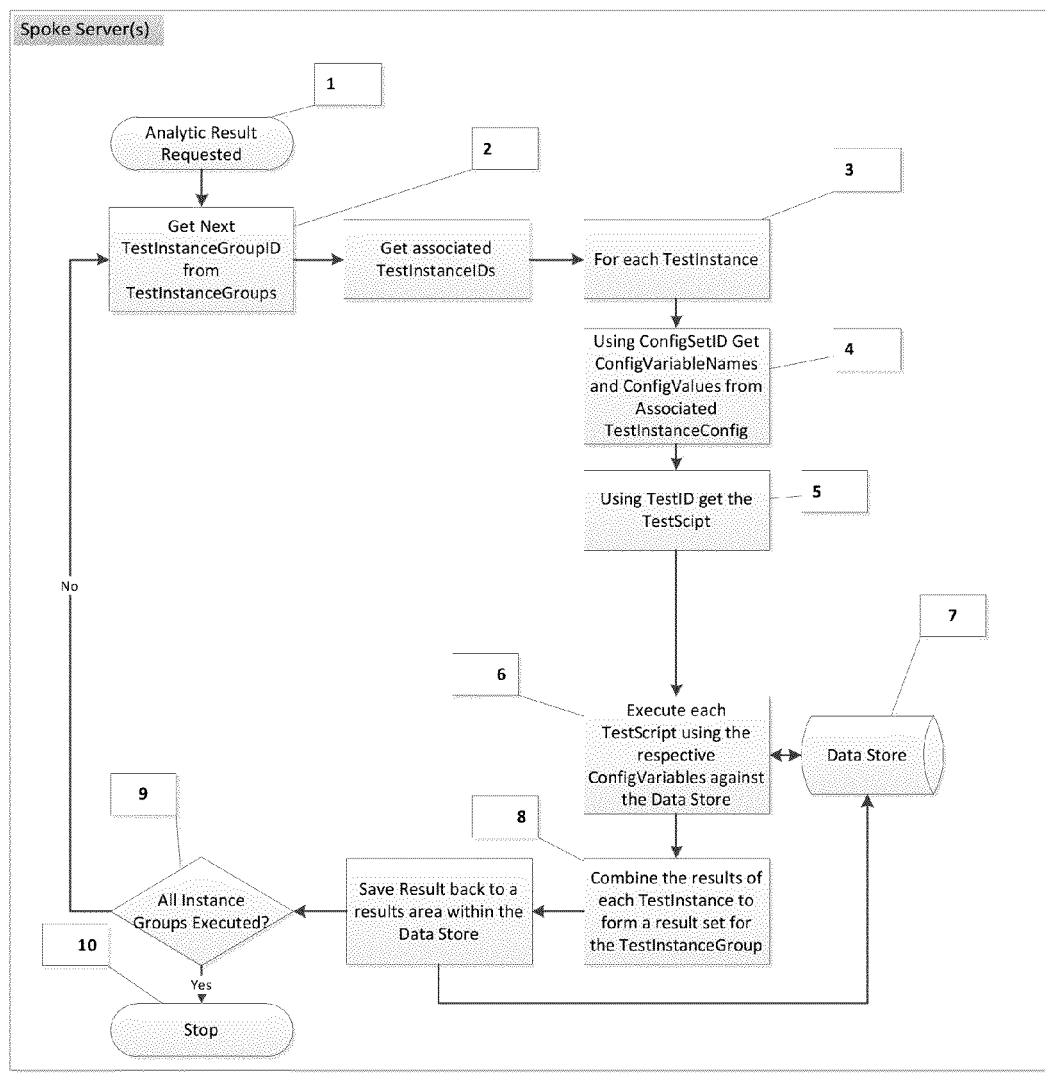
FIG. 8 is a flow diagram of part of a fourth one of the methods of FIG. 2: the execution of data analysis tests by a data analysis test executor.
Figure 9:
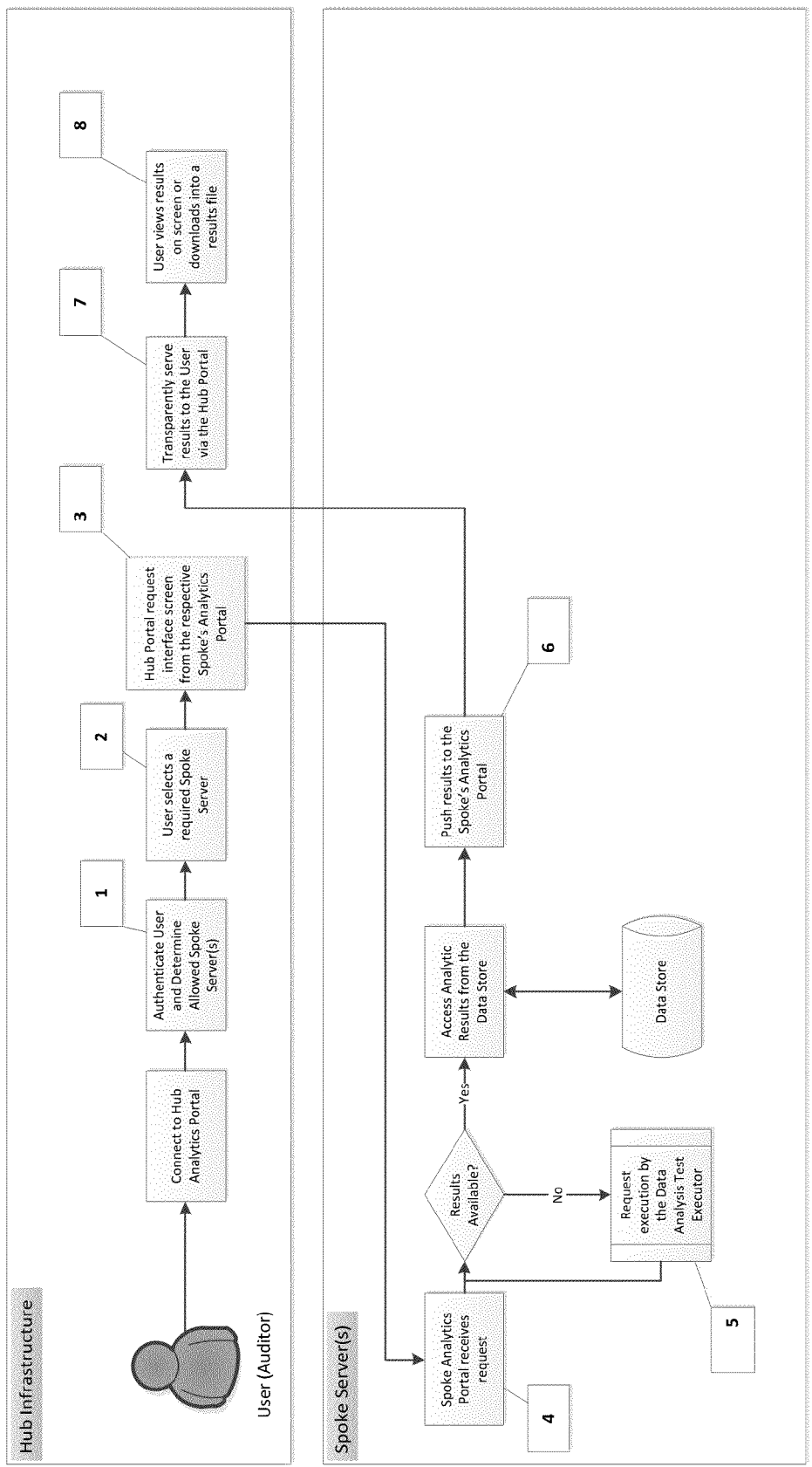
FIG. 9 is a flow diagram of another part of the fourth one of the methods of FIG. 2: allowing a user to access a spoke server via the hub infrastructure for the purpose of collection of results.

FIGS. 8 and 9 depict the process for a user to request a data analysis test result, and the process for executing the requested analysis.

Turning first to FIG. 8, this shows part of the data analysis test executor process flow, the fourth of the operations shown at a high level on FIG. 2. In this process flow, the result of a data analysis test is requested 8.1 from the data analysis test executor 3.9. The test is formed of a TestInstanceGroup 6.4. A TestInstanceGroup 6.4 may contain one or more data analysis tests from the master analytic library 3.6 or the bespoke analytic library 3.7. The TestInstanceGroup 6.4 holds together the selected tests, and also the configuration of these tests. FIG. 6 show details of a data structure for this information. This structure includes a list (Tests) 6.1 of available tests from the spoke's master analytic library 3.6 and bespoke analytic library 3.7, including the test name and the code for the data analysis test which is run. It also includes a list (TestInstances) 6.2 of all the tests selected by the user from the master analytic library 3.6, matched against the specific configuration for the instance of the test (e.g. use the threshold $5,000) from an analytic configuration repository (TestInstanceConfig) 6.3 composed of these configurations. The structure further includes, in TestInstanceGroups 6.4, compound test group names. There is a mapping (TestInstanceGroupMapping) 6.5 between the compound test group names 6.4 and the tests (TestInstances) 6.2 held within them. Finally, the data structure includes part (TestConfig) 6.6 of the master analytic library 3.6 which provides the user with the list of the items which can be configured for each test.

A TestInstance is retrieved from the TestInstanceGroups 6.4. For each TestInstance 8.3 (i.e. each individual test within the TestInstanceGroup 6.4), the following steps in FIG. 8 are performed in series or in parallel: the TestInstance's ConfigValues are obtained 8.4, noting that the test may be used multiple times by the system with different configurations (i.e. One TestInstanceGroup 6.4 may require the test "Values Greater than X" with a configuration value of $50,000, whereas another requires the value $100,000). The test script is obtained 8.5. The test script may be a data analysis test in any programming language or equivalent. The test script is executed 8.6, using the ConfigValues against the data store 1.10 in order to obtain the result. As described above, with reference to FIG. 3. The data store 1.10 contains the raw data provided to the spoke server 1.12a, 1.12b. Once all TestInstances have been executed, the results are combined 8.8 to form a result for the TestInstanceGroup 6.4. If further TestInstanceGroups 6.4 require to be executed, the process is restarted 8.9 for the next TestInstanceGroup 6.4. If all data analysis tests have been executed, the data analysis test executor can stop processing 8.10.

FIG. 9 shows the second part of the final spoke analytics portal process flow: result collection. In this process, a user 1.2 on the hub network connects to the hub 1.13 infrastructure, typically from an end user PC or laptop. As for the process of test setup and configuration, described with reference to FIG. 5, the user 1.2 authenticates 9.1 in order to confirm his or her identity to the hub 1.13. The hub 1.13 then determines which spoke or spokes 1.12a, 1.12b the user 1.2 is allowed to access. The user 1.2 then selects 9.2 the spoke server 1.12a, 1.12b he or she wishes to access. All future requests processed by the hub 1.13 in this session will then be executed, transparently, by the respective spoke server, 1.12a, 1.12b. Again, as with the process of test setup and configuration (FIG. 5), the transparent element means that there are no further user 1.2 actions required to access the spoke 1.12a, 1.12b, nor is the user 1.2 aware of the additional activities undertaken to obtain the results from the spoke 1.12a, 1.12b. The hub 1.13 passes requests 9.3 between itself and the spoke server 1.12a, 1.12b in order to present the user 1.2 with a user interface (possible examples of which are shown in FIGS. 7 and 10) to request the results of the data analysis tests. The spoke analytics portal 3.14 awaits a request from the hub 1.13 server. Once a request is received 9.4, this is processed locally and a result returned 9.6 to the user 1.2 once the analysis is complete. Where the user 1.2 has requested 9.5 the result of a data analysis test which has not already been executed, the data analysis test executor (detailed in FIG. 8) is used to process the test and return the result. Results, or further information, are passed 9.6 back to the hub 1.13, which is then in turn presented to the user 1.2. Results or information appear 9.7 to the user 1.2, to have come from the hub 1.13 server. However, all processing has taken place on the respective spoke server 1.12a, 1.12b. Results can then be viewed 9.8 on the end user's PC or laptop. The results may take the form of a web page, application screen, or file download (such as spreadsheet file).

FIG. 10 shows an example user interface within a spoke server's 1.12a, 1.12b results portal. To the end user, the page appears 10.1 to come from the hub portal 1.4 due to the transparent nature of the connection between the hub portal 1.4 and the spoke analytics portal 1.7. All configuration and data held within the spoke server 1.12a, 1.12b is held locally and is not impacted 10.2 by configuration or data changes within other spoke servers 1.12a, 1.12b.

The invention claimed is:

1. A method of data processing between a hub computer and a plurality of spoke computers, the hub computer arranged to communicate with each of the spoke computers, each spoke computer remote from the hub computer and from each other, the method comprising:
    (a) receiving at the hub computer from a user a request for a spoke computer to run a data processing operation on accounting data of an organization hosting the spoke computer, the accounting data locally accessible by the spoke computer;
    (b) the hub computer communicating the request to the spoke computer;
    (c) in response to receiving the request, the spoke computer running the data processing operation on the accounting data, the data processing operation comprising: accessing the accounting data locally accessible by the spoke computer, performing data analysis tasks against the accessed accounting data, and storing the processed accounting data results:
    (d) receiving at the hub computer a request for the results of the data processing operation to be returned to the hub computer for accessing by the user or another user, and (e) the spoke computer returning the processed results of the data processing operation to the hub computer.

2. A method according to claim 1 and comprising a step subsequent to step (e) of the hub computer returning the results to the user.

3. A method according to claim 1, where the request received at the hub computer from the user is a request to run the data processing operation at a selected group of the spoke computers, and wherein the selected group of the spoke computers runs the data processing operation in response to the request.

4. A method according to claim 1, wherein the request for the spoke computer to run the data processing operation comprises implementation information indicative of how the data processing operation is to be implemented, and wherein the spoke computer implements the data processing operation according to the implementation information.

5. A method according to claim 4, wherein the implementation information comprises instantiation information indicative of how a general data processing operation is to be instantiated.

6. A method according to claim 4, wherein the implementation information comprises configuration information indicative of thresholds with respect to which the instantiated data processing operation is to be carried out.

7. A method according to claim 5, wherein the implementation information comprises configuration information indicative of thresholds with respect to which the instantiated data processing operation is to be carried out, and step (e) comprises running the instantiated data processing operation with respect to the thresholds.

8. A method according to claim 1, comprising the step of the user or another user developing an analytic at the hub computer, the analytic comprising information indicative of the data processing operation.

9. A method according to claim 8, and comprising the step of adding the analytic to an analytic library at the hub computer, the analytic library locally accessible by the host and comprising a plurality of analytics, each analytic comprising information indicative of a respective data processing operation to be carried out by a spoke computer.

10. A method according to claim 9 and comprising the step of communicating the analytic library to the spoke computer.

11. A method according to claim 10 and comprising the user selecting a group of the spoke computers, and communicating the analytic library to each spoke computer in the group.

12. A method according to claim 11, wherein steps (c) and (e) are carried out by each spoke computer in the group.

13. A method according to claim 9, wherein the request received at the hub computer to run the data processing operation comprises selecting one or more analytics from the analytic library at the spoke computer.

14. A method according to claim 10, wherein the step of communicating the analytic to each spoke computer is preceded by the step of a user generating a new analytic that is not comprised in the analytic library, the new analytic indicative of a new data processing operation to be carried out by the or a spoke computer on the accounting data.

15. A method according to claim 14 further comprising communicating the new analytic to each selected spoke computer.

16. A hub computer arranged to communicate with each of a plurality of spoke computers, each spoke computer remote from the hub computer and from each other, the hub computer comprising a communication unit arranged to:

receive from a user a request for the a spoke computer to run a data processing operation on accounting data of an organization hosting the spoke computer, the accounting data locally accessible by the spoke computer, the data processing operation comprising:

accessing the accounting data locally accessible by the spoke computer, performing data analysis tasks against the accessed accounting data, and storing the processed accounting data results: communicate the request to the spoke computer;

receive, at the hub computer, a request for the results of the data processing operation to be returned to the hub computer for accessing by the user or another user, and receive the processed results of a data processing operation from the spoke computer, wherein the results of the data processing operation received from the spoke computer are the result of the spoke computer running the data processing operation in response to the request from the hub computer.

17. A spoke computer, computer arranged to communicate with a hub computer, the spoke computer remote from the hub computer, the spoke computer comprising:

a communication unit arranged to receive a request from the hub computer for the spoke computer to run a data processing operation on accounting data of an organization hosting the spoke computer, the data processing operation comprising:

accessing the accounting data locally accessible by the spoke computer, performing data analysis tasks against the accessed accounting data, and storing the processed results: and a processing unit arranged to run the data processing operation on the accounting data, in response to the receipt by the communication unit of the request;

the spoke computer communication unit further arranged to return the processed results of the data processing operation to the hub computer, wherein the hub computer further receives a request for the results of the data processing operation to be returned to the hub computer for accessing by the user or another user.

18. A computer program product embodied on a non-transitory computer readable medium, comprising code executable by a hub computer arranged to communicate with each of a plurality of spoke computer computers, each spoke computer remote from the hub computer and from each other, to cause the hub computer to carry out the following steps:

(a) receiving at the hub computer from a user a request for the spoke computer to run a data processing operation on accounting data of an organization hosting the spoke computer, the accounting data locally accessible by the spoke computer, the data processing operation comprising:

accessing the accounting data locally accessible by the spoke computer, performing data analysis tasks against the accessed accounting data, and storing the processed accounting data results;

(b) the hub computer communicating the request to the spoke computer;

(c) the hub computer receiving a request for the results of the data processing operation to be returned to the hub computer for accessing by the user or another user, and (d) the hub computer receiving the processed results of a data processing operation from the spoke computer.

\* \* \* \* \*